United States Patent [19]

Gray et al.

[11] 3,885,023

[45] May 20, 1975

[54] PREPARATION OF IRON CARBIDE ($FE_3C$)

[75] Inventors: Peter R. Gray; Billy J. Leroy, both of Bartlesville, Okla.

[73] Assignee: Phillips Petroleum Company, Bartlesville, Okla.

[22] Filed: Feb. 15, 1973

[21] Appl. No.: 332,567

[52] U.S. Cl. ................................................ 423/439
[51] Int. Cl. ............................................ C01b 33/12
[58] Field of Search ........................ 423/439, 659 F

[56] References Cited

UNITED STATES PATENTS 2,780,537    2/1957    Stelling et al. .................. 423/439 X

*Primary Examiner*—Oscar R. Vertiz
*Assistant Examiner*—Eugene T. Wheelock

[57] ABSTRACT

Essentially pure iron carbide in high yield is prepared by reducing iron oxide in the presence of carbon monoxide at temperatures in the range of 500°–550°C.

4 Claims, No Drawings

PREPARATION OF IRON CARBIDE ($Fe_3C$)

BACKGROUND OF THE INVENTION

1. Field of the Invention

This invention relates to a process for the preparation of iron carbide ($Fe_3C$), also known as cementite.

2. Related Prior Art

The preparation of iron carbide has, in the past, been accomplished using a variety of processes. Thus, for example, U.S. Pat. No. 2,535,042 discloses a multistep preparation of iron carbide which includes the reduction of a fused mass of iron oxide in a stream of hydrogen at 450°C for about 82 hours to reduce substantially all of the iron oxide to metallic iron; carburization of the resulting mass at 240°C for about 1 hour; and use of the carburized mass in an inert atmosphere at 578°C for about 12 minutes to obtain a product containing about 85 percent iron carbide. The proposed reaction set forth in U.S. Pat. No. 2,535,042 is the reduction of iron oxide to free iron, the partial carburization of the free iron to iron carbide and the reaction of free iron and iron carbide to form $Fe_3C$. This reaction relies upon the discontinuance of the carburization before the atom ratio of carbon to iron reaches 1:2 so that a mixture of $Fe_2C$ and free iron will be present.

In U.S. Pat. No. 2,562,806, iron-based catalysts are carbided by treatment prior to or during the synthesis reaction with carbon monoxide and hydrogen for a time sufficient to convert some of the catalysts to carbides of iron, principally $Fe_2C$. The reaction temperature for such conversion is between about 500° to 800°F.

In U.S. Pat. No. 2,780,537, iron carbide is prepared by adding iron oxides to beds already containing a large proportion of iron carbide, and the mixture thereof is treated with carbon monoxide and hydrogen at a temperature within the range of 400°C–900°C.

U.S. Pat. No. 3,494,738 discloses the production of iron carbide by heating ferrocene (dicyclopentadienyl iron) at a temperature from about 475°–600°C and at a pressure of less than about 50 microns of mercury, i.e., at a low pressure in a closed system. The product thus obtained contains a large proportion of free carbon.

OBJECTS OF THE INVENTION

It is the object of this invention to provide a process for preparing iron carbide at higher conversion rates and in higher yields than have heretofore been obtainable.

It is a further object of this invention to provide a process for obtaining high yields of iron carbide which is essentially pure.

It is another object of this invention to provide a process for preparing iron carbide which contains no significant amounts of free carbon.

STATEMENT OF THE INVENTION

In accordance with this invention, it has been found that unusually high yields of essentially pure iron carbide ($Fe_3C$) can be obtained when the iron carbide is prepared by reducing iron oxide in the presence of carbon monoxide at temperatures in the range of 500°–550°C.

Iron carbide prepared in accordance with this invention is particularly suitable for use as a low temperature synthetic catalyst and as a catalyst in heterogeneous reactions such as the Fischer-Tropsch reaction. One of the problems that has previously arisen in the use of an iron carbide catalyst is the contamination of such materials with free carbon which causes deactivation of the catalyst. Thus, iron carbide catalysts prepared in accordance with this invention are particularly desirable since they contain at least about 98 weight percent iron carbide and no significant amounts of free carbon.

DESCRIPTION OF PREFERRED EMBODIMENTS

The process according to this invention comprises treating a feed material consisting essentially of iron oxide ($Fe_2O_3$) with a gas which is essentially pure carbon monoxide at a temperature within the range of about 500°–550°C to obtain a product containing at least about 98 percent $Fe_3C$. The reaction is preferably carried out at a temperature within a range of about 510°–540°C. The narrow temperature range set forth herein is critical to this invention since there has been demonstrated to be a significant decrease in free carbon content of the product when the reaction is carried out within this range. I.e., a product containing a very high percentage of iron carbide (at least about 98 weight percent) and no significant amount of free carbon is obtained when the reaction is carried out in this range.

The molar ratio of carbon monoxide to iron oxide is usually in the range of 13:3 with a threefold excess of carbon monoxide being particularly preferred, i.e., a molar ratio of 13:1.

More specifically, in the instant preparation of iron carbide, a feed material consisting essentially of ferric oxide ($Fe_2O_3$) is introduced into a reactor. No substantial amounts of any other materials such as iron carbide should be present in the reactor. The reactor is maintained at the desired reaction temperature, i.e., within the range of about 500°–550°C or, preferably, within the range of about 510°–540°C. The top of the reactor is open to the atmosphere and, thus, exposed to atmospheric pressure. The reactor is brought up to the desired reaction temperature with air circulating upwardly to the ferric oxide in the reactor which is in a vertical position.

When the desired reaction temperature is reached, the air is shut off and essentially pure carbon monoxide is introduced at a sufficient rate to fluidize the ferric oxide. The heating and circulation of the carbon monoxide is continued for a time sufficient to insure complete reaction of the ferric oxide. Typical heating times are within the range of 30 to 35 minutes. At the end of the reaction, the reactor is removed from the furnace and cooled to room temperature, while carbon monoxide or an inert gas such as nitrogen or argon is circulated through the reactor. The carbon monoxide, nitrogen or argon is circulated while the reactor is cooled in order that no air may come in contact with the newly produced iron carbide. Such cooling may take about 10 to 20 minutes. After the iron carbide is cooled, it is removed from the reactor.

Pretreatment of the feed material with air increases the temperature thereof to the desired treating temperature, so that when the carbon monoxide is introduced, the ferric oxide is already at the desired reaction temperature.

Iron carbide prepared in accordance with this invention has been tested by Mossbauer spectrographic analysis, X-ray diffraction and carbon analysis, and it has been found that iron carbide which is at least 98 percent pure and which is often 99 percent pure is obtained. The obtention of such high purity iron carbide is extremely significant in terms of efficiency of reaction and in terms of providing a catalytic material which is unusually active due to the significant absence of free carbon.

SPECIFIC EXAMPLES

Example I

A feed material consisting essentially of 75 grams of sized ferric oxide (20–40, 40–60, 60–80 mesh) was placed in a glass reactor which was approximately one inch in diameter and eight inches in length and which was fitted with a fritted disc approximately two inches from the bottom to support the ferric oxide. The reactor was used in the vertical position surrounded with a ceramic tube furnace and a thermocouple was taped to the outside of the reactor wall to monitor the reaction temperature. Atmospheric pressure was maintained in the reactor by maintaining the reactor with an upper open end which was exposed to the atmosphere.

The reactor was brought to the temperature of 500°–550°C with air circulating upwardly through the ferric oxide. Once the temperature of 500°–550°C was reached, the air flow was shut off and essentially pure carbon monoxide was introduced at a sufficient rate to fluidize the ferric oxide. The temperature of the reactor was maintained at 525°C. The heating and circulation of the carbon monoxide was continued for approximately thirty minutes, at the end of which the reactor was removed from the furnace and cooled to room temperature while argon gas was circulated in order that no air could come in contact with the newly produced iron carbide. The reaction was allowed to cool for about twenty minutes, after which the iron carbide was removed from the reactor and tested in a Mossbauer spectrometer. The iron carbide produced in this Example was found to be 99 percent pure. The test results for this Example are indicated in the table below.

Examples II–VII

The above-described process was carried out under the identical conditions described in Example I, except that the temperature of preparation was varied. The preparation temperature and the Mossbauer analysis of the resulting materials are set forth below:

TABLE

| Examples | Temperature of Preparation | Mossbauer Iron Analysis | Carbon Analysis |
|---|---|---|---|
| II | 300°C | $Fe_2O_3$; no $Fe_3C$ | — |
| III | 400°C | 50% $Fe_3O_4$; 50% $Fe_3C$ | 7.5% |
| IV | 500°C | $Fe_3C$; no $Fe_3O_4$ | 10.3% |
| I | 525°C | $Fe_3C$; no $Fe_3O_4$ | 8.1% |
| V | 550°C | $Fe_3C$; no $Fe_3O_4$ | 11.0% |
| VI | 600°C | $Fe_3C$; no $Fe_3O_4$ | 21.2% |
| VII | 675°C | $Fe_3C$; no $Fe_3O_4$ | 14.7% |

From the above data, it can be seen that there is a temperature range within which the instant process produces all iron carbide (complete conversion from ferric oxide) and yet does not produce any substantial amount of contaminating free carbon.

The stoichiometric carbon content of iron carbide is 6.7 percent. Thus, in the runs performed within the 500°–550°C temperature range (Examples IV–VI), a carbon content of only 8.1 to 11.0 percent is shown, thus indicating products which are 96 to 99 percent iron carbide. At 600°C (Example VII), the carbon analysis shows a substantial increase, i.e., approximately double that at 550°C.

Thus, iron carbide prepared at temperatures outside of the range disclosed in this application are contaminated with a variety of impurities including residual ferric oxide, lower oxides of iron, free iron and free carbon.

As will be evident to those skilled in the art, there are variations and modifications of this invention which can be practiced in view of the foregoing disclosure without departing from the spirit and scope of the invention.

We claim:

1. A process for preparing high yields of essentially pure iron carbide, which comprises treating in a batch a feed material consisting essentially of ferric oxide at atmospheric pressure with a gas consisting essentially of carbon monoxide at a temperature within the range of 500°–550°C for a period of time sufficient to allow essentially complete conversion to occur and produce a product containing at least about 98 weight percent iron carbide ($Fe_3C$).

2. The process in accordance with claim 1 wherein the reaction is carried out at a temperature within the range of about 510°–540°C.

3. The process according to claim 1 wherein the carbon monoxide is present in an amount which is a threefold excess.

4. The process according to claim 1 wherein said feed material is contacted with air while the temperature of the ferric oxide is brought up to the reaction temperature of 500°–550°C prior to treating with carbon monoxide, terminating the flow of air after the ferric oxide has been heated to said reaction temperature, and then contacting said feed material heated to said reaction temperature with CO.

* * * * *